United States Patent

[11] 3,634,848

| [72] | Inventors | Emil R. Prunk<br>Hackensack;<br>Joseph P. Staluppi, Wayne, both of N.J. |
|---|---|---|
| [21] | Appl. No. | 804,887 |
| [22] | Filed | Mar. 6, 1969 |
| [45] | Patented | Jan. 11, 1972 |
| [73] | Assignee | The Bendix Corporation |

[54] OPTICALLY DIGITIZED TRANSMISSION DUAL TAPE OVERLAY DISPLAY APPARATUS
12 Claims, 4 Drawing Figs.

[52] U.S. Cl. .................................................. 340/324,
250/219 D, 340/27, 340/187, 340/347 PR
[51] Int. Cl. ........................................................ G08b 23/00
[50] Field of Search ................................................ 340/324,
347 PR, 187, 25, 27; 235/61.11 R, 61.11 E, 61.11
H; 250/219 D, 219 Q

[56] References Cited
UNITED STATES PATENTS

| 2,477,673 | 8/1949 | Weisman | 340/315 |
|---|---|---|---|
| 2,965,727 | 12/1960 | Passman | 340/324 |
| 3,046,542 | 7/1962 | Hager | 340/324 |
| 3,047,852 | 7/1962 | Smith | 340/324 |
| 3,199,097 | 8/1965 | Hartley | 340/324 |
| 3,266,019 | 8/1966 | Beckwith | 340/154 |
| 3,281,820 | 10/1966 | Snider | 340/324 |
| 3,386,088 | 5/1968 | Johnston | 340/324 |
| 3,440,642 | 5/1969 | Levine | 340/347 |
| 3,457,641 | 7/1969 | Watson | 29/625 |
| 3,467,957 | 9/1969 | Levine | 340/347 |
| 3,182,631 | 5/1965 | Gomes | 73/178 |
| 3,188,998 | 6/1965 | Wood | 73/178 |
| 3,222,666 | 12/1965 | Hallden | 340/324 |
| 3,381,656 | 5/1968 | Ohnikian | 340/27 |

*Primary Examiner*—Donald J. Yusko
*Assistant Examiner*—Robert J. Mooney
*Attorneys*—Anthony F. Cuoco and Plante, Hartz, Smith and Thompson

ABSTRACT: Optically digitized transmissive dual tape overlay display apparatus including a display tape having a functional scale and a generally opaque tape having light transmitting areas arranged in a coded pattern according to the scale. The tapes pass a viewing aperture of a display instrument in overlaying relation for displaying the scale and within the instrument the coded tape passes intermediate light emitters and light sensors whereby light is transmitted in coded relation to the display for providing corresponding digital signals.

INVENTORS:
EMIL R. PRUNK
JOSEPH P. STALUPPI

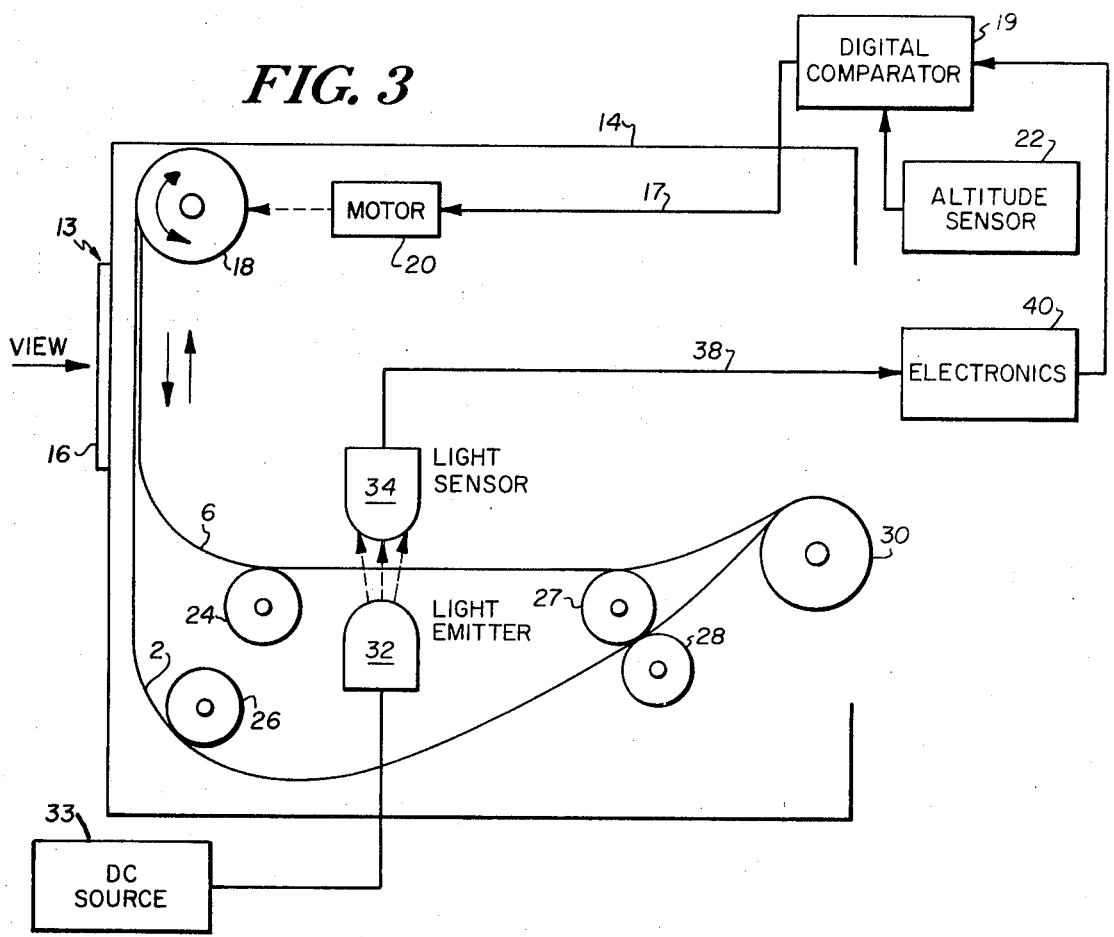
FIG. 3
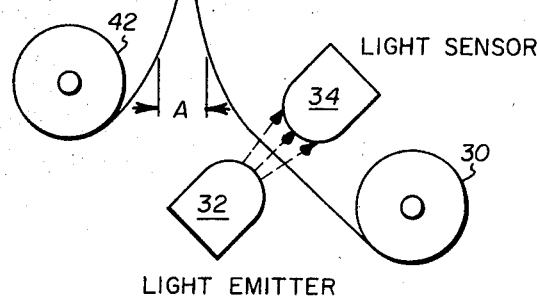
FIG. 4
INVENTORS:
EMIL R. PRUNK
JOSEPH P. STALUPPI
BY
ATTORNEY

OPTICALLY DIGITIZED TRANSMISSION DUAL TAPE OVERLAY DISPLAY APPARATUS

BACKGROUND OF THE INVENTIon

1. Field of the Invention

This invention relates to apparatus for providing digital signals corresponding to displayed condition data and, more particularly, to optical means whereby said signals are provided in response to light transmitted in coded relation to the displayed data.

2. Description of the Prior Art

Aircraft instruments for displaying flight condition data generally include movable display tapes having functional scales readable against a reference line or marker. Modern aircraft have digitally integrated avionics systems so that a digital readout type transducing device is desirable.

Initially, electromechanical devices were used for this purpose, but were soon abandoned because of size and inaccuracies. There difficulties were overcome by using electrostatic apparatus such as described in copending U.S. application Ser. No. 406,680 filed Oct. 27, 1964, by Alfred L. Levine, and assigned to The Bendix Corporation, assignee of the present invention and which application issued on Apr. 22, 1969 as U.S. Pat. No. 3,440,642. However, the electrostatic equipment has proven to be costly and it has been necessary to consider alternate means for accomplishing the task.

Although it was realized that optical means would provide a satisfactory alternate, especially in view of recent advances in miniaturizing light emitters and sensors, little advancement was made prior to the present invention because the devices proposed required alteration of the display tape and hence interfered with the display capabilities of the device.

SUMMARY OF THE INVENTIOn

The present invention overcomes the aforenoted disadvantage of optical devices by providing a dual tape overlay system. One of the dual tapes has a functional scale corresponding to condition data and the other tape has transparent or perforated areas for transmitting light in a coded pattern according to the scale. The tapes move in overlaying relation while passing the viewing aperture of an indication instrument for displaying the condition data. Within the instrument the tapes are separated so that the coded tape passes intermediate miniature light emitters and light sensors, and the tapes are aligned so that the coded tape transmits light in accordance with the displayed condition data for providing corresponding digital signals.

One object of this invention is to provide novel optical digitized display apparatus simple in construction and small in size so as to be suitable for flight and space applications.

Another object of this invention is to provide apparatus for displaying condition data and to provide corresponding digital signals without affecting the display capabilities of said apparatus.

Another object of this invention is to provide light transmissive apparatus for providing the digital signals.

Another object of this invention is to provide digitized tape display apparatus including a dual tape arrangement wherein one of the dual tapes has a functional scale for displaying condition data and the other tape has light transmitting areas arranged in a coded pattern according to the scale.

Another object of this invention is to arrange the tapes in overlaying relation while passing the viewing aperture of a display instrument so that the scaled tape displays the condition data and to arrange the tapes within the instrument so that the coded tape transmits light in a pattern corresponding to the displayed data.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE DRAWINGs

FIG. 3 is a diagrammatic representation showing an embodiment of the invention wherein the coded tape and the scaled tape originate from the same motor driven spool and terminate at the same takeup spool.

FIG. 4 is a diagrammatic representation showing another embodiment of the invention wherein both tapes originate from the same motor driven spool, but terminate at different takeup spools.

DESCRIPTION OF THE INVENTION

Figure 1:
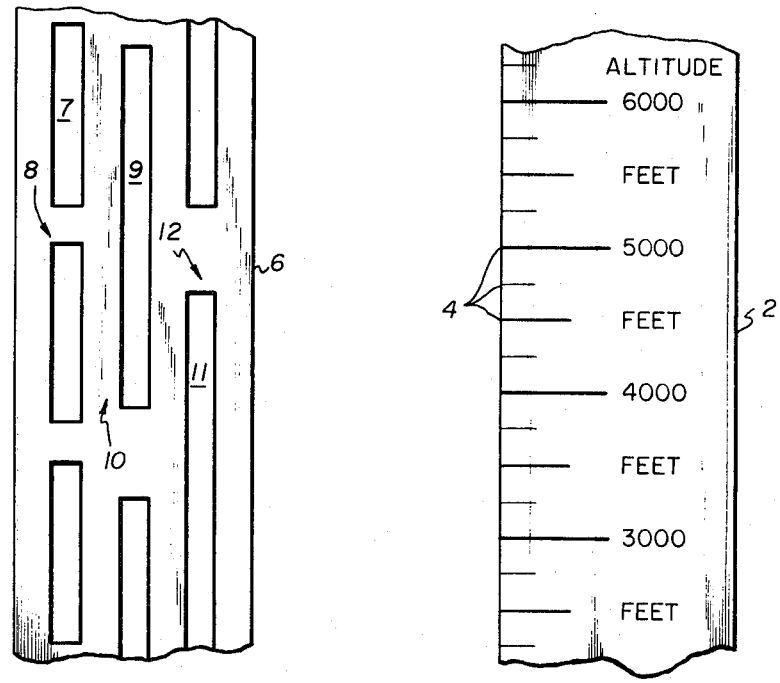
FIG. 1 is a pictorial representation showing the coded tape and the scaled tape according to the invention.

FIG. 1 shows a display tape 2 of a suitable flexible and durable material and having a graduated functional scale 4 thereon. The scale corresponds to a condition to be measured, and which condition may, for purposes of example, be the altitude of an aircraft. A tape 6 of a generally opaque and similarly flexible and durable material has a plurality of channels shown for purposes of example as being three in number and designated by the numerals 8, 10 and 12. Each of the channels 8, 10 and 12 has a plurality of longitudinally extending light-transmitting areas, with one of the light-transmitting areas for each of the channels being herein referred to for purposes of example, and which referred to areas in channels 8, 10 and 12 are designated by the numerals 7, 9 and 11, respectively.

Light-transmitting areas 7, 9 and 11 may be transparent or, alternatively, may be perforations arranged in a gray code pattern corresponding to functional scale 4 on tape 2. It will be understood that the length and number of the light transmitting areas is a function of the display tape scale, range and desired resolution.

In developing the device of the invention several types of optical apparatus were considered, to wit: light-reflective apparatus and light-transmissive apparatus. Light-reflective apparatus requires that tape 6 be of black light absorptive material and areas 7, 9 and 11 be shiny such as might be provided by a polished metallic or otherwise suitable mirror surface. Light-transmissive apparatus, on the other hand, merely requires a generally opaque or light absorptive tape with the areas 7, 9 and 11 being suitably transparent or being perforations as the case may be.

In this connection it is to be noted that a photoetching method of manufacturing a digitally coded tape has been developed for the electrostatic apparatus described in the aforementioned copending U.S. application Ser. No. 406,680, and which method is disclosed and claimed in copending U.S. application Ser. No. 641,042, filed May 24, 1967, by William F. Watson and assigned to The Bendix Corporation, assignee of the present invention and which application issued on July 29, 1969 as U.S. Pat. No. 3,457,641. It has been found that tapes so designed and manufactured are suitable for use in light transmissive apparatus and the device of the invention was developed accordingly.

Figure 2:
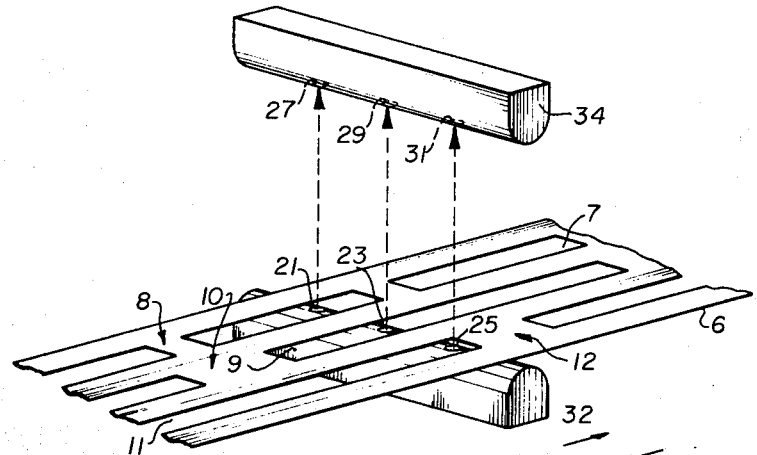
FIG. 2 is a pictorial representation showing light transmissive apparatus according to the invention.

With reference to FIG. 2, tape 6 is shown arranged for movement intermediate a light source 32 and a light sensor 34. Light source 32 includes a plurality of PN planer gallium arsenide, infrared light-emitting elements shown for purposes of example as being three in number and designated by the numerals 21, 23 and 25. Elements 21, 23 and 25 are disposed in an array so as to correspond to the spacing of channels 8, 10 and 12 on tape 6 and may be of the type manufactured by Texas Instruments, Inc., and which elements carry the trade designation Type TIXL01 as described in Texas Instrument Bulletin No. DL-S 657272. These elements are of the miniaturized type, having overall dimensions of approximately 0.090 inches in diameter by 0.100 inches long.

Light sensor 34 includes similarly dimensioned NPN planer, silicon light-sensing elements 27, 29 and 31 arranged in an array corresponding to that of light source 32. Elements 27, 29 and 31 may be of the type manufactured by Texas Instruments, Inc., and which elements carry the trade designation Type LS600 as described in Texas Instrument Bulletin No. DL–S 633820. Light emitting and light-sensing arrays of the type herein referred to are described in Texas Instrument Bulletin No. SC–1104A040 968.

FIG. 3 shows an aircraft altitude indicating instrument embodying the invention and designated generally by the numeral 13. Instrument 13 includes a case 14 and a viewing aperture 16. Mounted within case 14 is a spool 18 driven in either a clockwise or counterclockwise direction by a motor 20, and which motor 20 is, in turn, driven in response to the output of a digital comparator 19 as will be hereinafter explained, rollers 24, 26, 27 and 28 and a spring-biased takeup spool 30.

Coded tape 6 is wound on spool 18 so as to originate thereat and is guided over rollers 24 and 27 and between light emitter 32, energized by a suitable DC source 33, and light sensor 34 so as to be wound on and terminate at takeup spool 30. Indicating tape 2 is wound on roller 18 so as to originate thereat and is guided under roller 26 and between rollers 27 and 28 so as to likewise be wound on and terminate at said spool 30.

The tapes are thus in an overlying arrangement as they pass viewing aperture 16 of instrument 13 with tape 2 displaying aircraft altitude, and within the instrument the tapes are separated by rollers 24, 26, 27 and 28. The tapes are so aligned that when a particular altitude readout is provided by tape 2, appropriate light transmitting areas 7, 9 and 11 on tape 6 transmit light from emitter 32 in a coded pattern corresponding to the displayed altitude, and which light is sensed by sensor 34. Light sensor 34 provides at an output conductor 38 thereof electrical pulses corresponding to the sensed light, and which electrical pulses are applied to suitable electronics apparatus 40 for providing corresponding digital outputs. Electronics apparatus 40 may be of the type for converting low level outputs from light sensor 34 to usable high level outputs, and in this sense is a device such as the optoelectronics pulse amplifier described in an article entitled "Photodiodes Couple and Isolate" published in the May, 1968 issue of *The Electronic Engineer*, pages 91–96. The digital outputs are applied to digital comparator 19 which compares the digital outputs with position command digital outputs provided by an altitude sensor 24. Altitude sensor 22 may be a conventional type altimeter coupled to circuitry such as described in the aforenoted U.S. Pat. No. 3,440,642 and shown in FIG. 2 thereof, and which circuitry is effective for providing digital signals corresponding to variations in altitude. Comparator 19 provides at an output conductor 17 thereof a difference signal in accordance with the comparison for driving motor 20 and thereby providing a servo loop for eliminating the error between the altitude command from sensor 22 and the position of tape 6. Comparator 19 may be a conventional binary adder-subtractor. Devices of this type suitable for purposes of the invention are described in *Pulse, Digital, and Switching Waveforms*, Millman & Taub, McGraw Hill, 1965 at pages 338–342.

FIG. 4 shows a form of the invention wherein rollers 24, 26, 27 and 28 shown in FIG. 3 are eliminated and tape 2 is wound on and terminates at a spring biased takeup spool 42. In this connection it is to be noted that the arrangement shown in FIG. 4 minimizes the accuracy problem brought about by the aforenoted alignment of tapes 2 and 6 and the required separation thereof whereby tape 6 passes between light emitter 32 and light sensor 34, since the tapes move in overlaying arrangement for a relatively large part of their linear travel. Thus, using a miniaturized optical system employing light sensing and light emitting arrays as heretofore noted, the fan-out or separation of the tapes, and which fan-out is designated as A in the figure, can be minimized to insure greater read out accuracy.

OPERATION

The device of the present invention uses arrays of miniaturized light emitting and light-sensing elements in conjunction with a dual tape overlay system for providing digitized tape display apparatus. The dual tapes are arranged to move in overlaying relation while passing viewing aperture 16 of instrument 13, whereby scaled tape 2 displays condition data, and thereafter the tapes are arranged so that tape 6, having transparent or perforated areas, transmits light in a coded pattern corresponding to the displayed data, and which light is sensed by sensor 34.

The novel features of the invention are best appreciated when it is considered that indicating instruments of the type herein referred to have viewing apertures of 5 to 6 inches in length and tapes up to 12 feet in length. It is imperative that the digital outputs be provided with a high degree of accuracy and the display capabilities of the instrument remain unimpaired. The invention satisfies these requirements and does so without undue complexity so as to be particularly adaptable for flight or space applications.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Tape display apparatus, comprising:
   an elongated tape having a functional scale corresponding to a condition;
   another elongated tape having a plurality of signal providing means arranged in coded relation to the functional scale; and
   the scaled and coded tapes being arranged to move in overlaying relation in accordance with the condition so that the scaled tape displays condition data and the coded tape transmits signals in a coded pattern corresponding to the displayed data.

2. Apparatus as described in claim 1, including:
   the signal providing means includes a plurality of light transmitting areas arranged in coded relation to the functional scale;
   a light emitter;
   a light sensor disposed adjacent the light emitter; and
   the coded tape being arranged to move intermediate the light emitter and light sensor so that light from the emitter is transmitted in the coded pattern and the sensor senses the transmitted light to provide corresponding electrical signals.

3. Apparatus as described by claim 2, including:
   means connected to the light sensor and responsive to the signals therefrom for providing corresponding digital outputs.

4. Apparatus as described by claim 3 including a closed feedback loop, said loop comprising:
   a condition sensor for providing digital outputs corresponding to the condition;
   a comparator connected to the condition sensor and to the digital output means, and responsive to the outputs therefrom for providing an output corresponding to the difference therebetween; and
   means connected to the comparator and to the scaled and coded tapes for moving said tapes in response to the difference signal.

5. Apparatus as described by claim 4, including:
   a driven spool coupled to the tape moving means so as to be driven thereby;
   a spring loaded takeup spool; and
   the scaled and coded tapes being wound on the driven spool and being wound on the takeup spool.

6. Apparatus as described by claim 5, including:
   another takeup spool; and one of said scaled and coded tapes being wound on the first mentioned takeup spool and the other tape being wound on the other takeup spool.
7. Apparatus as described by claim 2, including:
means for separating the tapes so that the coded tape moves intermediate the light emitter and light sensor.
8. Apparatus as described by claim 1, wherein:
the light-transmitting areas on the coded tape are transparent.
9. Apparatus as described by claim 1, wherein:
the light-transmitting areas are perforations.
10. Apparatus as described by claim 1, wherein:
the light-transmitting areas are arranged laterally and longitudinally in a coded pattern according to the functional scale.
11. An instrument for displaying condition data and for providing corresponding digital outputs, comprising:
an instrument case having a viewing aperture, and having mounted therein a rotatably mounted spool, a takeup spool, light-emitting means and light-sensing means;
an elongated tape having a functional scale corresponding to the condition, said tape being wound on the rotatably mounted spool so as to originate thereat and wound on the takeup spool so as to terminate thereat;
an elongated tape having a plurality of light-transmitting areas arranged in coded relation to the functional scale, said tape being wound on the rotatably mounted spool so as to originate thereat and wound on the takeup spool so as to terminate thereat;
means for guiding the tapes whereby the scaled tape overlays the coded tape within the area of the instrument viewing aperture and the tapes are separated beyond said aperture so that the coded tape passes intermediate the light emitter and light sensor;
a motor for driving the rotatably mounted spool so that the tapes pass the viewing aperture with the scaled tape displaying condition data and the coded tape transmitting light from the light emitter to the light sensor, said light sensor providing electrical outputs corresponding to the displayed data;
means connected to the light sensor and responsive to the signals therefrom for providing corresponding digital outputs;
a condition sensor for providing digital outputs varying with the condition;
a comparator connected to the condition sensor and to the last-mentioned means for comparing the digital outputs therefrom and for providing a difference signal; and
the motor connected to the comparator for driving the rotatably mounted spool in response to the difference signal.
12. An instrument for displaying condition data and for providing corresponding digital outputs, comprising:
an instrument case having a viewing aperture, and having mounted therein a rotatably mounted spool, first and second takeup spools, light-emitting means and light-sensing means;
an elongated tape having a functional scale corresponding to the condition, said tape being wound on the rotatably mounted spool so as to originate thereat and wound on one of the first and second takeup spools so as to terminate thereat;
an elongated tape having a plurality of light transmitting areas arranged in coded relation to the functional scale, said tape being wound on the rotatably mounted spool so as to originate thereat and wound on the other of the first and second takeup spools so as to terminate thereat;
means for guiding the tapes whereby the scaled tape overlays the coded tape within the area of the instrument viewing aperture and the tapes are separated beyond said aperture so that the coded tape passes intermediate the light emitter and light sensor;
a motor for driving the rotatably mounted spool so that the tapes pass the viewing aperture with the scaled tape displaying condition data and the coded tape transmitting light from the light emitter to the light sensor, said light sensor providing electrical outputs corresponding to the displayed data;
means connected to the light sensor and responsive to the signals therefrom for providing corresponding digital outputs;
a condition sensor for providing digital outputs varying with the condition;
a comparator connected to the condition sensor and to the last mentioned means for comparing the outputs therefrom and for providing a difference signal; and
the motor connected to the comparator for driving the rotatably mounted spool in response to the difference signal.

* * * * *